United States Patent Office 3,092,176
Patented June 4, 1963

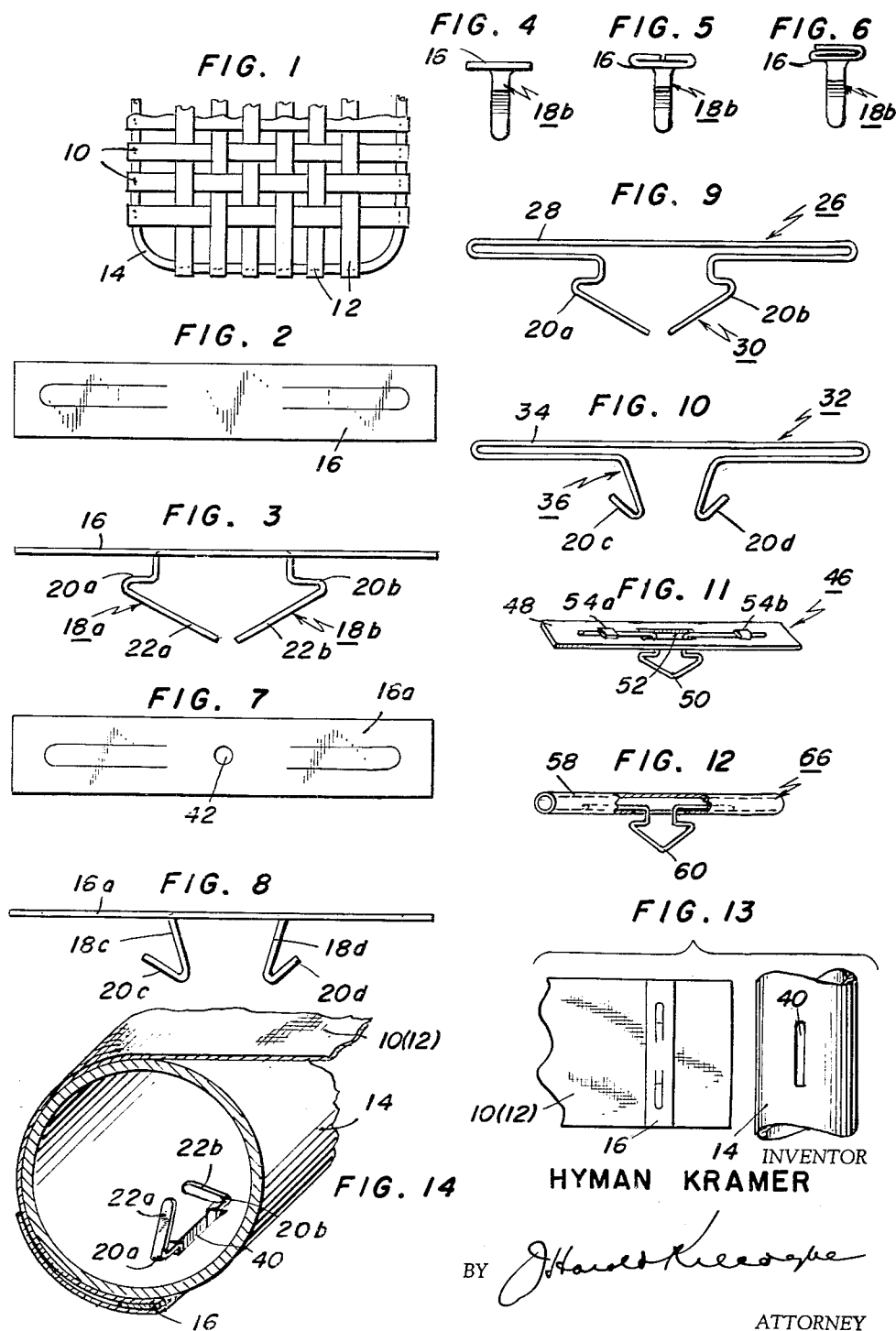

---

3,092,176
WEB-TO-TUBE FASTENINGS
Hyman Kramer, 2764 E. 16th St., Brooklyn, N.Y.
Filed Dec. 24, 1958, Ser. No. 782,817
10 Claims. (Cl. 160—404)

This invention relates to improvements in web-to-tube fastenings, and more particularly to an improved fastening having marked utility in securing the ends of the webbing strip which make up the seat and/or back elements of tubular frame furniture to the tubing of the frame, and to improved fasteners for use in such a fastening.

In my prior filed application Serial No. 763,951, filed September 29, 1958, now Patent No. 2,979,119, of which the present application is a continuation-in-part, I have disclosed various forms of drive- or force-in fasteners (as distinguished from the more conventional hook and slip-in types), characterized by T-shape in side elevation of which the top bar has length corresponding substantially to the width of the webbing and the vertical leg provides a driving shank and further has means for snapping beneath and thereby locking the fastener to the under edge of the tubing opening through which it is driven. Such a fastener is adapted to be affixed to the end of the webbing strip in a preliminary operation, as by passing the aforesaid leg or shank through a slit cut in the webbing-strip end portion about an inch back from the strip end-edge (or the shank may be forcefully pushed by hand through said strip-end at the location of the slit) whereupon the webbing strip goes to the operator who or machine which completes the fastening with fasteners attached. It is a feature of such a fastener that it enables a substantial length portion of the webbing strip, i.e. the approximate inch of strip extending between the top bar of the fastener and the strip end-edge to be folded under (in the final fastening) said fastener top-bar, thereby to form a strip underlap portion which is pressed tight against the tubing surface on which it engages by the overlying or main portion of said strip, as yields high fastening power which increases as weight is placed on the fastened webbing strip.

Stated generally, an object of the present invention is to further refine and improve webbing strip-to-tubing fastenings employing a T-fastener as aforesaid through the provision of simplified fastener construction which not only yields economies in manufacture but also simplifies the completion of the fastening.

A more particular object of the invention is the provision of an improved T-type fastener for webbing strip-to-tubing fastenings.

Another object of the invention is the provision of an improved fastener as aforesaid whose improved construction lends itself to fabrication from either sheet metal, wire or bendable strip stock.

Yet another object of the invention is the provision of an improved T-type fastener as aforesaid characterized in that its vertical leg or shank is capable of self-locking itself to the tubing by virtue of its longitudinal (axially of said tubing) flexibility.

Still another object of the invention is the provision of an improved T-type fastener for webbing strip-to-tubing fastenings characterized by its ability to self-lock itself to the end lips or edges of the usually elongated or slot-like tubing openings provided to receive the driving point or shank of said fastener.

The above and other objects and advantages of the improved fastening and fastener construction for use therewith according to this invention will appear from the following detailed description thereof, taken with the accompanying drawings illustrative thereof, wherein—

FIG. 1 is a fragmentary view of a seat (or back) of a piece of tubular frame furniture fashioned from interlaced fabric or plastic webbing strips secured at their ends to the tubular framing thereof as by a fastening as herein proposed;

FIGS. 2, 3 and 4 are top plan, side elevation and end views, respectively, of one form of improved fastener for use as aforesaid on an enlarged scale;

FIGS. 5 and 6 are end views illustrating modified forms of the fastener shown in FIGS. 2–4 inclusive, characterized principally by stiffened top-bar construction;

FIGS. 7 and 8 are top plan and side elevational views illustrating another form of fastener as aforesaid, which is characterized by modified shank construction;

FIGS. 9 and 10 are side elevations similar to FIGS. 3 and 8, respectively, which illustrate fasteners of the same configuration thereof made of wire, but it is to be understood that FIGS. 9 and 10 may also be taken as illustrating fasteners made of thin strip stock also;

FIGS. 11 and 12 are side elevations illustrating variants of yet another main form of T-fastener according to the invention which is featured by a rigid bar-type head and a resilient shank of general arrow-head configuration made of spring wire;

FIG. 13 is a fragmentary view illustrating a preliminarily assembled fastener and webbing ready for the final fastening operation; and FIG. 14 is a broken-away perspective view of a completed fastening employing a fastener of the form shown in FIGS. 2–4 inclusive.

Referring to the drawings, FIG. 1 generally illustrates the manner in which interlaced fabric or plastic webbing strips 10, 12 secured at their ends to tubular framing 14 thereof are conventionally employed to make up the back and/or seat of so-called tubular metal furniture as above forecast. The present invention is addressed to an improved webbing strip end-to-tubing fastening and to an improved fastener for use therewith, as will now be described.

In common with the fastener (in its numerous forms) disclosed and claimed in my aforesaid application Serial No. 763,951, the fastener of the instant invention is of general T-configuration as viewed in side elevation and comprises, according to the FIGS. 2–4 form thereof, a bar-like head 16 and an edgewise contractible shank constituted by two depending legs 18a, 18b formed by two oppositely extending tongues struck out from the material of the head and bent downwardly therefrom so as to have mutually spaced relation lengthwise of said top bar. Preferably, each of said legs is formed intermediate its ends with an endwise-directed hump defining an abruptly angled, shoulder-forming means intermediate the ends thereof and with coverging lower end portions, which latter constitute camming surfaces, said humps (which are designated 20a, 20b) and lower end portions (which are designated 22a, 22b) being thus oppositely disposed and combining to impart arrow-head shape to the shank considered as a whole. Further, the humps 20a, 20b are spaced inwardly (downwardly) from the under side of the fastener head 16 a distance substantially equal to and in practice slightly greater than the wall thickness of the tubing for which the fastener is designed, and the overall longitudinal or edgewise spacing between said humps is substantially greater than the length of the usually slot-like opening provided in the tubing to receive said fastener, or similarly greater than the diameter of said opening if such is formed round. For the round tubing opening, the aforesaid humps 20a, 20b and the depending lower end portions 22a, 22b of the shank legs may be formed on arcs of a circle having a common center and radii enabling said parts considered together to function much as a circular stud.

A fastener as aforesaid may be simply and economically produced in a combined stamping and pressing-out operation from sheet metal strip stock of the requisite gauge and springiness as to enable the legs 18a, 18b forming the arrow-head shaped shank to snap in under the end edges or lips of the tubing opening after being compressed (brought together) consequent to the fastener being driven or forcibly pushed through said opening. Of course, the aforesaid fastener shank legs, or for that matter, may be heat-treated following its fabrication to impart the requisite spring properties to the shank legs. In the event that said legs are formed arcuate for the round tubing opening as suggested above, the arcuate formation may be produced by coining the leg-forming tongues to arcuate shape either during or after they are struck out from the metal of the fastener top bar.

To stiffen the fastener top-bar 16 as may be necessary consequent to its loss of material in striking out the legs 18a 18b from the longitudinal middle portion thereof, the top-bar longitudinal side edges may be turned inwardly so as to overlie and hence stiffen said longitudinal middle portion, the inturned edges having abutting relation as in FIG. 5 or overlapping relation as in FIG. 6. Such also further narrows the fastener top bar which is desirable.

FIGS. 7 and 8 illustrate a variant form of sheet metal fastener as above, which differs from the FIGS. 2–4 fastener in that the tongues which form the fastener legs (shank portion), rather than being bent to approximate arrow-head configuration, may incline downwardly-slightly inwardly from the fastener head 16a as at 18c, 18d and terminate in oppositely inclined, upwardly opening hooks 20c, 20d whose free ends or points are spaced from the under side of the head a distance substantially equal to and in practice somewhat greater than the wall thickness of the tubing for which the fastener is intended and in effect define abruptly angled, shoulder-forming locking portions. Like the humps 20a, 20b, the hooks 20c, 20d are spaced apart a distance greater than the end lips or edges of the tubing opening provided therefor, but due to the springiness and hence contractibility of the fastener shank as a whole, said hooks are adapted to snap in under said end lips or edges as the fastener shank is forced into and thence home in its tubing opening.

While the fasteners as described above have been shown to be of the individual or unit type, their construction is such that they may be readily made up in strip form wherein a plurality of such fasteners are connected together in end-to-end or tandem arrangement, as suggested in my aforesaid application Serial No. 763,951. As explained in such application, a fastener strip comprising a plurality of tandem-connected fasteners has utility in fastening one-piece fabric or plastic seat or back panels to furniture-frame tubing also adapted to take the smaller-width webbing strip and hence provided with the short-length openings suitable for the webbing strip fastenings.

FIGS. 9 and 10 illustrate a modified fastener having the same general configuration in side elevation as the FIGS. 3 and 8 fasteners, but differing therefrom in that they are made from stiff wire. More particularly, the fastener 26 of the FIG. 9 form is made from a single length of such wire bent to provide a head 28 and a shank 30 shaped approximately as an arrow-head so as to provide the humps 20a 20b serving as locking hooks; and the fastener 32 of the FIG. 10 form is similarly made from a single length of wire bent to provide a head 34 and a shank 36 consisting of depending legs terminating in hooks 20c, 20d similar to those of FIG. 8.

Alternatively, the FIGS. 9 and 10 fasteners may be taken as fabricated from small-width strip stock, preferably of a springy nature, rather than from round wire; or its requisite springiness may be supplied by heat-treating the fasteners after they have been completed to the aforesaid configuration.

FIGS. 11 and 12 illustrate interesting variants of another main form of fastener which combines the bar-like head feature of the FIGS. 2–8 form and the spring-wire shank feature of the FIGS. 9 and 10 form. More particularly, the FIG. 11 fastener 46 comprises an elongated, narrow-width bar-like head 48 with a slot 52 therein and a shank made from a single length of spring wire bent in its middle portion to the shape of a closed-point and downwardly pointing arrow-head 50 which is spaced from the fastener head by parallel legs which extend upwardly through an elongated slot provided in the said head to the upper surface thereof, said legs terminating as ends which are bent downwardly in opposite directions to lie flat against said upper surface, and being so secured as by bent-over tabs 54a, 54b struck out from the material of the head. Consequent to the spacing of the parallel shank legs and the length of the head slot through which they extend, the shank is yieldable in the axial direction of the tubing to which it is to be applied, as with the shanks of the FIGS. 3 and 9 forms, and thus the hump or barbs of the shank yield in moving into the tubing opening and thereupon snap in under the end lips or edges of the tubing opening.

The FIG. 12 fastener 66 operates on the same principle as the aforesaid FIG. 11 fastener and differs therefrom structurally only in that its head 58 is tubular and the spring-wire shank 60 is held to the head solely by its outer-bent wire ends engaging in the bore thereof.

FIG. 13 illustrates the manner of relating a fastener of the invention according to any one of the above described forms thereof to the webbing strip end to be secure in a preliminary operation. More particularly, the fastener and its webbing strip end are preliminarily assembled to one another by pressing the shank of the fastener through a slit cut or otherwise provided in the end portion of the webbing strip about an inch back from its terminal end edge, the fastener being of course meantime held so that its head extends transversely across the strip end as in FIG. 13. Assuming proper length of slit, the shank secures itself to the webbing strip with sufficient security that the webbing strips with fasteners attached to both ends thereof form a sub-assembly unit capable of being handled as such as it proceeds to the operator who or the machine which completes the fastening by forcing each fastener shank through the tubing opening provided to receive same, which is designated at 40, FIG. 13, with a simple straight-line movement of the fastener. During such movement, the converging terminal portions of the fastener-shank legs engage against the lips or edges of said opening 40 with a camming action, as effects edgewise contraction of the shank and movement of the humps or hooks past said end lips, whereupon the legs spring back to their normal unstressed position, as in turn results in the humps or hooks snapping under and locking to said lips. It will be understood that FIG. 13 indicates the furniture frame to be turned so that the tubing opening 40 is disposed on an upwardly facing quadrant of said tubing 10, as requires the webing strip end, following folding back of its free end portion on the rear-edge line of the fastener (as also effects inversion of said fastener), to be drawn in rightwise direction under the tubing and thence outwardly over the top quadrant thereof, as results in the shank portion of the fastener being now downwardly disposed for its movement toward and through said upwardly disposed opening 40.

FIG. 14 illustrates the completed fastening employing a fastener of the FIG. 3 form and with the frame turned rightside up, as of course results in the fastener being inverted and the tubing opening 40 being now disposed in a downwardly facing quadrant of the tubing, whereby the webbing strip has an approximately 180° of wrap around the relatively outer side of tubing prior to its proceeding in straightwise direction to the companion tubing to which its other end is fastened. The view further illustrates that in the completed fastening the aforesaid folded-over free end portion of the strip now forms an underlap portion which wraps directly about the outer surface of the tubing and is held tightly against said surface by the overlapping main portion of the webbing strip with a force which increases with the load or weight placed on the strip. Such holding action of course is in addition to the snugging action which the relatively rearward fastener top bar edge and/or under-edge portion exerts on the under-lap portion of the webbing strip as the latter is tensioned by weight placed thereon, as results in the fastener top bar tending to pull sidewardly with respect to the tubing, or move simply to cock sidewardly. FIG. 14 also illustrates the self-locking action of the fastener, as provided by the humps 20a, 20b snapping in under the end edges or lips of the tubing opening 40 following their movement through said opening, which is such that when once applied the fastener secures to the tubing against unintentional or accidental removal therefrom, regardless of the tensioned or slack condition of the webbing strips.

Without detailing the fastenings formed by the other forms of fasteners herein disclosed, it will be understood that they achieve the same highly effective strip-end fastening and are moreover characterized by their ability to self-lock themselves to the end edges or lips of their tubing openings.

In connection with the hole 42 provided in the central portion of the fastener top bar 16a of the FIGS. 7 and 8 form, such provides for the insertion of a leverage-applying tool point which facilitates the tensioning of the strip against an already completed fastening of a strip end, as is usually necessary to effect alignment of the shank of the second-to-be-completed strip fastening with its tubing opening 40. This operation is more completely described in my application Serial No. 784,186, filed December 31, 1958.

Without further analysis, it will be appreciated that the webbing strip-to-tubing fastening and the various forms of fasteners for use therewith as above described satisfies the objectives of the invention as explained in the foregoing in simple yet effective and thoroughly dependable manner. However, as many changes could be made in carrying out the above constructions without departing from the scope of the invention, it is intended that all matter contained in the above description or shown in the accompanying drawings shall be interpreted as illustrative and not in a limiting sense.

I claim:

1. In tubular-frame furniture construction, a fastening assembly comprising the combination of a tubular frame member having a relatively elongated opening in its wall which is defined in part by end lips spaced a predetermined axial distance apart, a webbing strip folded on itself so as to have overlying and folded-under end portions, a self-locking fastener of generally T-configuration including an elongated bar-like head portion having length corresponding substantially to the width of the webbing strip and including a longitudinal side edge over which the end portion of the webbing strip is folded and defining the line of fold between said overlying and folded-under portions, at least the other longitudinal side edge of said head portion being positioned to engage and press upon said folded-under end portion of the strip adjacent said line of fold, and a depending shank portion disposed in a plane extending substantially vertically through and from end to end of said head portion and projecting through both an opening in the folded-under end portion of the webbing strip and said tubing opening into the tubing interior, said shank portion comprising a pair of spring legs depending integrally from the middle length portion of the head portion and being spaced from one another throughout their entire length in the direction of the length dimension of said head portion and terminating in free ends whereby said legs may flex both in unison and relatively of one another, said legs incorporating inclined camming portions which are spaced apart a distance which is effectively greater than the distance between the end lips of the frame-member opening and abruptly angled, shoulder-forming locking portions which extend from said inclined camming portions also in the direction of the length dimension of said head portion and are spaced from the under surface of the head portion a distance corresponding substantially to the thickness of the wall of the frame member bounding its said opening, said camming and locking portions enabling said shank portion to contract in edgewise direction and thereupon, in expanding, to self-lock itself to the end lips of the opening responsively to insertion of the shank portion into said opening.

2. For use in tubular-frame furniture construction, a fastener for securing the end of a fabric webbing strip to a tubing-form frame member of said furniture comprising a generally T-shaped member having a bar-like top part of length corresponding substantially to the width of the webbing strip, the vertical leg of the T-member forming a fastener shank which depends from the middle length portion of the top bar in a plane extending substantially vertically through and from end to end of said top bar and is adapted to be forcefully inserted into an elongated opening in the tubing defined in part by axially spaced end lips, the shank comprising a pair of spring legs integral with said top bar and being spaced from one another throughout their entire length in the direction of the length dimension of said top bar and terminating in free ends whereby said legs may flex both in unison and relatively to one another, said spring legs incorporating inclined camming portions which are spaced apart a distance which is effectively greater than the distance between the end lips of said elongated opening and abruptly angled, shoulder-forming locking portions which extend from said inclined camming portions also in the direction of the length dimension of said head portion and are spaced from the under surface of the top bar a distance corresponding substantially to the thickness of the wall of the tubing bounding its said elongated opening, said camming and locking portions enabling said shank to contract in edgewise direction and thereupon, in expanding, to self-lock itself to said end lips responsively to insertion of the shank into said elongated tubing opening.

3. A fastening according to claim 1, wherein said fastener is made of sheet material and said legs each comprises an area cut from the middle-length portion of the fastener head portion.

4. A fastening according to claim 1, wherein said fastener comprises a length of fastener material having both its end portions doubled back on itself to form said elongated head portion, and said end portions extend substantially at a right angle from the so-formed head portion and form the spring legs making up the fastener shank portion.

5. A fastening according to claim 1, wherein said spring legs are formed in their intermediate portions with oppositely extending humps from which their free end portions incline toward one another to an open point, whereby said legs together impart substantially arrowhead configuration to the shank, said inclined free-end and hump portions of the spring legs comprising the aforesaid camming and locking portions, respectively, of the fastener shank portion.

6. A fastening according to claim 1, wherein the corresponding portions of the spring legs of the fastener adjacent the head portion thereof converge towards one another and the corresponding free end portions of said spring legs incline outwardly-rearwardly away from one another, said outwardly-rearwardly inclined portions of the legs and their end edges, respectively, comprising said camming and locking portions, respectively, of the shank portion.

7. A fastener for a webbing strip-to-tubing fastening according to claim 2, wherein said fastener is made of sheet material and said spring legs each comprises an area cut from the middle-length portion of the fastener top bar.

8. A fastener for a webbing strip-to-tubing fastening according to claim 2, wherein said fastener comprises a length of fastener material having both its end portions doubled back on itself to form said elongated top bar, and said end portions extend substantially at a right angle from the so-formed top bar and form said spring legs making up the fastener shank.

9. A fastener according to claim 2, wherein said spring legs are formed in their intermediate portions with oppositely extending humps from which their free end portions incline towards one another to an open point, whereby said legs together impart substantially arrowhead configuration to the fastener shank, said inclined end portions and humps comprising the aforesaid camming and locking portions, respectively, of said shank.

10. A fastener according to claim 2, wherein the corresponding portions of the spring legs adjacent the fastener top bar converge towards one another and the corresponding free end portions of said spring legs incline relatively outwardly-rearwardly away from one another, said outwardly-rearwardly inclined portions of the leg and their end edges, respectively, comprising said camming and locking portions of the fastener shank.

References Cited in the file of this patent

UNITED STATES PATENTS

| | | |
|---|---|---|
| 1,679,266 | Place | July 31, 1928 |
| 2,643,433 | Scott | June 30, 1953 |
| 2,825,948 | Parkin | Mar. 11, 1958 |
| 2,884,994 | Rosalsky | May 5, 1959 |
| 2,935,770 | Gagnier | May 10, 1960 |
| 2,937,696 | Arnold | May 24, 1960 |

FOREIGN PATENTS

| | | |
|---|---|---|
| 457,575 | Great Britain | Feb. 18, 1936 |
| 841,590 | France | Feb. 13, 1939 |